Patented Aug. 8, 1950

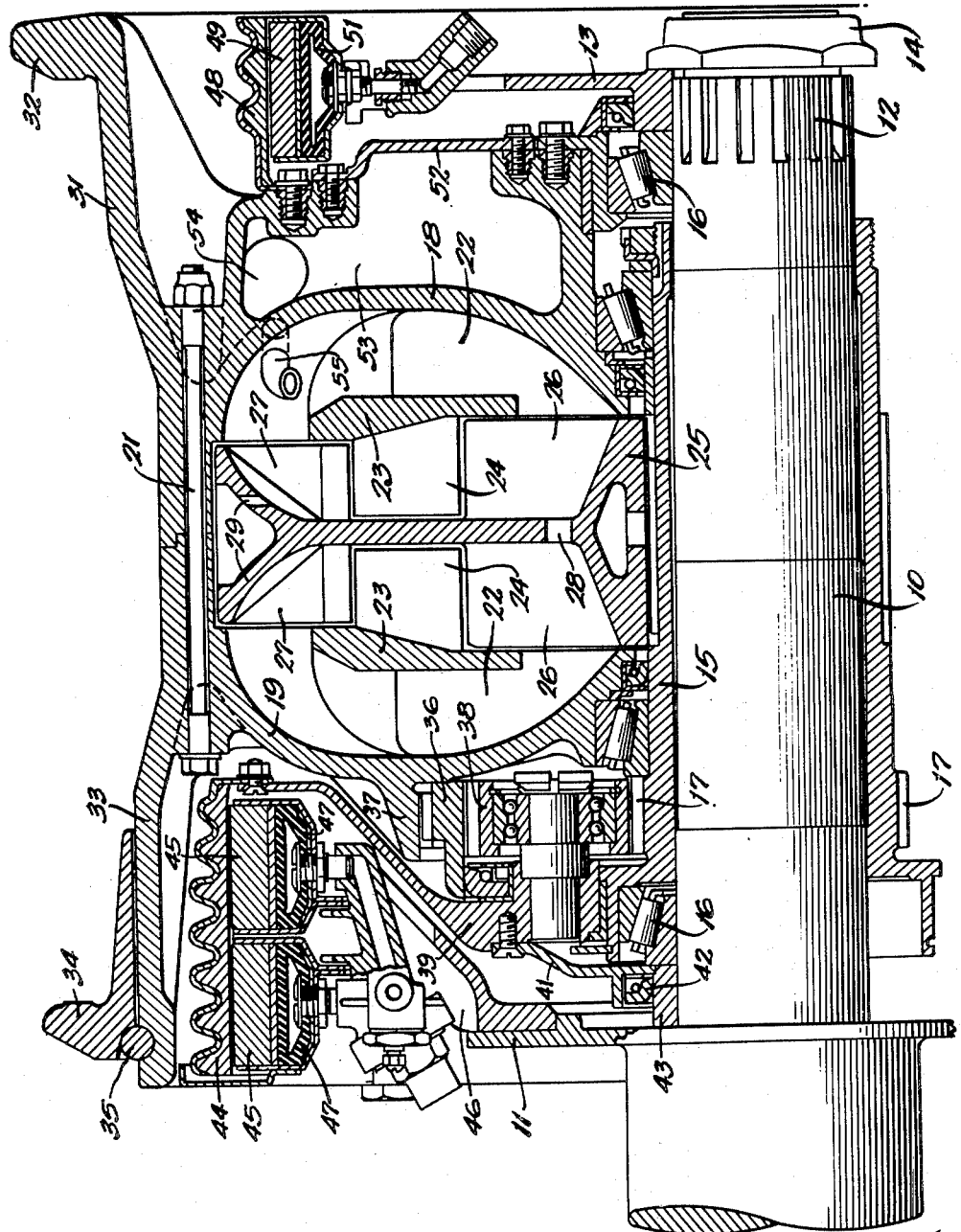

2,517,531

UNITED STATES PATENT OFFICE 2,517,531

HYDRODYNAMIC BRAKE FOR VEHICLES

Rexford Olan Anderson, Chicago, Ill., assignor to Foote Bros. Gear and Machine Corporation, Chicago, Ill., a corporation of Delaware Application October 19, 1946, Serial No. 704,419

7 Claims. (Cl. 188—90)

This invention relates to braking apparatus and more particularly to a combined wheel and hydraulic brake for use on aircraft or the like.

One of the objects of the invention is to provide braking apparatus which produces maximum torque capacity in a minimum size. In the preferred construction this is accomplished by causing the two members of a hydraulic unit to turn at a relative speed in excess of the speed of the part to be braked.

Another object is to provide braking apparatus which is controllable as to initiation of hydraulic braking action and to production of a locked condition.

Still another object is to provide braking apparatus including a hydraulic unit which automatically functions to maintain a substantially constant torque during a braking operation. Preferably the torque is varied by automatically varying the quantity of liquid in the unit in response to speed changes.

A further object is to provide a combined wheel and braking apparatus in which the braking apparatus forms the supporting structure of the wheel. In the construction illustrated the braking apparatus includes a hydraulic unit whose housing supports the wheel rim.

A still further object is to provide a combined wheel and braking apparatus which is of minimum size and weight so that the entire braking mechanism can be mounted within a rim portion which is the same size as a conventional wheel rim.

The above and other objects and advantages of the invention will be more readily apparent from the following description when read in connection with the accompanying drawing, in which the single figure is a partial section through a combined wheel and braking apparatus embodying the invention.

The wheel and braking apparatus illustrated on the drawing is of the type adapted to be used on aircraft and is carried by a fixed axle 10 which may be supported by the under carriage or landing gear of an aircraft.

It will be understood that the landing gear may be of either the fixed or retractable type, as desired. As shown, the axle 10 is formed at its inner end with a supporting flange 11 and terminates at its outer end in a splined or grooved portion 12 to receive an end holding plate or collar 13 which may be held rigidly on the axle by a nut 14.

The axle 10 rotatably supports a tubular shaft 15 which is mounted on bearings 16 on the axle. The shaft 15 may have a cup shaped enlargement at its inner end to receive the inner bearing which is of the roller type and is formed adjacent the enlarged inner end with a sun gear 17. A hydraulic coupling unit is rotatably supported on the shaft 15 and on the axle. As shown, the unit is formed with two complementary housing castings 18 and 19 which are rigidly secured together by bolts 21 to form an annular hollow housing. Each of the castings 18 and 19 carry on its inner surface a set of generally radially extending vanes 22 which carry centrally of their length core rings 23 which in turn carry short central vanes 24. The unit is completed by a rotor including a supporting frame or web 25 splined to the shaft 15 and extending centrally into the housing. The frame 25 carries at its opposite sides inner sets of vanes 26 and at its outer end radially beyond the vanes 24 carries outer sets of vanes 27. This construction provides a coupling of the type more particularly described and claimed in the patent to Anderson and Carson, No. 2,150,539, although other types of hydraulic couplings could be used, if desired. The construction shown provides a double coupling having a toroidal fluid circulating chamber on each side of the central rotor support, the chambers being connected by an opening 28 through the support at its inner portion and by openings 29 through the support at its outer portion.

The housing for the hydraulic coupling unit also provides the supporting structure for the wheel rim. As shown, the casting 18 is formed with an annular extension 31 projecting outwardly therefrom and terminating in an outwardly turned rim 32. The casting 19 carries a similar annular extension 33 which is adapted to receive a rim 34 held thereon by a split ring 35. It will be seen that the annular extensions 31 and 32 form a rim portion to receive and support a tire such as the usual pneumatic aircraft tire.

The casing and rotor of the hydraulic unit are adapted to be connected by a planetary differential gear set including the sun gear 17 and a ring gear 36 carried by an annular flange 37 on the casting 19. The sun and ring gears mesh with planet pinions 38 which are rotatably supported on a gear carrier 39 which as shown is rotatably mounted on the enlarged end portion of the shaft 15. A skirt 41 secured to the carrier carries a seal 42 engaging a spacer collar 43 on the axle to prevent escape of fluid around the shaft and axle. In addition, the carrier 39 is rigidly connected to a brake drum 44 which lies within the annular rim portion 33 to be engaged by brake shoes 45. The brake shoes are mounted through a fitting 46 on the stationary flange 11 and are adapted to be moved into engagement with the brake drum by supplying actuating fluid to flexible tubes 47 through appropriate conduits. The brake shoes 45 may be controlled in any desired manner, but it is contemplated that they shall be controlled manually by the pilot.

At the opposite end the casting 18 carries a brake drum 48 which lies within the annular rim portion 31 and which is adapted to be engaged by a brake shoe 49 carried by the end plate 13. The brake shoe 49 may be moved into engagement with the drum 48 by a flexible tube 51 supplied with actuating fluid under the control of the pilot.

The casting 18 is formed with an extension, as shown, closed by a cover plate 52 to form an annular liquid reservoir which is substantially coextensive radially with the housing. If desired, the reservoir may carry radially extending vanes or partitions 53 to insure that liquid therein will rotate with the housing, the partitions preferably being interrupted at their outer ends to provide an annular passage 54. Liquid from the reservoir may be conducted into the casing by one or more conduits 55 communicating with the annular space 54 and terminating in inwardly facing openings lying between the vanes 22 in the housing adjacent the outer ends of the vanes.

In use the unit is filled with sufficient liquid such as oil to slightly more than fill the operating chamber of the unit. When the wheel is stationary, the liquid will seek a common level in the operating chamber and the reservoir so that the operating chamber will be approximately half full. During landing operation both brakes 45 and 49 are disengaged so that all parts of the wheel and braking mechanism can rotate together either upon contact of the wheel with the ground or when the wheel is driven to pre-accelerate it before actual contact. When the wheel starts to rotate, the liquid will move by centrifugal force to the outer periphery of the operating chamber of the brake unit casing and of the reservoir so that the operating chamber will be approximately half or slightly more than half full and the reservoir will also be partially filled.

To initiate a braking operation after the plane is on the ground, the pilot may gradually engage the brakes 45 to bring the drum 44 and the carrier 39 to a stop. During this operation the rotor and the shaft 15 are gradually brought to a stop and are then driven in a direction reverse to that of the wheel and casing through the planetary differential gearing. As the rotor starts to turn relative to the casing, the liquid in the working chamber begins to circulate outwardly over the vanes 26, 24 and 27 and inwardly over the vanes 22 to transmit torque between the rotor and the casing. Since the rotor is turned in a reverse direction, the relative speed between the rotor and casing is greater than the casing and wheel so that a very high torque capacity can be obtained with a small unit. As circulation of liquid in the casing starts, liquid will be drawn into the casing from the reservoir through the conduits due to the aspirating effect of the conduits and to the centrifugal head maintained in the reservoir. Thus as braking proceeds and relative rotation between the rotor and casing decreases, the quantity of liquid in the casing is increased to increase the torque capacity of the unit. By properly balancing the size of the conduits 55 and the gearing, the torque can be maintained substantially constant throughout a braking operation or can be caused gradually to increase or decrease, as desired. To bring the plane to a final stop after substantially all of the braking energy has been absorbed by the hydraulic unit, the brake 49 can be engaged. Because this brake is required to absorb only a small portion of the total braking load, it can be made relatively small.

It will be noted that the entire unit provides a wheel whose rim diameter and axle length are the same as those as a conventional wheel with the entire braking apparatus contained within the outline of the rim. It will be seen that the braking apparatus according to the present invention can be made small and light in weight while at the same time providing a large braking capacity.

While one embodiment of the invention has been shown and described in detail herein, it will be understood that this is illustrative only and is not to be taken as a definition of the scope of the invention, reference being had for this purpose to the appended claims.

What is claimed is:

1. A combined wheel and braking apparatus comprising an annular hollow housing adapted to be rotatably mounted on an axle, annular rim portions carried by and projecting from the opposite sides of the housing to receive a tire, the housing serving to support the rim portions and the tire on the axle, vanes in the housing, a vaned rotor in the housing, a differential gear set mounted beside the housing within one of said rim portions including three relatively rotatable elements, means connecting two of the elements to the housing and rotor respectively, and a releasable brake lying within one of the rim portions and connected to the third element to hold it against rotation.

2. A combined wheel and braking apparatus comprising an annular hollow housing adapted to be rotatably mounted on an axle, annular rim portions carried by and projecting from the opposite sides of the housing to receive a tire, the housing serving to support the rim portions and the tire on the axle, vanes in the housing, a vaned rotor in the housing, a differential gear set mounted beside the housing within one of said rim portions including three relatively rotatable elements, means connecting two of the elements to the housing and rotor respectively, a releasable brake lying within one of the rim portions and connected to the third element to hold it against rotation, and a releasable brake lying within the other of the rim portions and connected to the housing to hold it against rotation.

3. A combined wheel and braking apparatus comprising an annular hollow housing adapted to be rotatably mounted on an axle, annular rim portions carried by and projecting from the opposite sides of the housing to receive a tire, the housing serving to support the rim portions and the tire on the axle, vanes in the housing, a vaned rotor in the housing, means forming a liquid reservoir at one side of the housing adjacent its periphery, the reservoir being carried by the housing for rotation therewith and being substantially coextensive radially with the housing, a conduit connecting the reservoir with the outer part of the housing at a point where liquid will flow inward and having an inwardly facing opening in the housing, a releasable brake, and means connecting the brake to the rotor.

4. A combined wheel and braking apparatus comprising an annular hollow housing adapted to be rotatably mounted on an axle, annular rim portions carried by and projecting from the opposite sides of the housing to receive a tire, the housing serving to support the rim portions and the tire on the axle, vanes in the housing, a vaned rotor in the housing, means forming a liquid reservoir at one side of the housing adjacent its periphery, the reservoir being carried by the housing for rotation therewith and being substantially coextensive radially with the housing, a conduit connecting the reservoir with the outer part of the housing at a point where liquid will flow inward and having an inwardly facing opening in the housing, a planetary gear set including a sun gear, a ring gear, a gear carrier meshing with the sun and ring gears, the sun and ring gears being connected to the rotor and casing respectively, and a releasable brake connected to the carrier to hold it against rotation.

5. A combined wheel and braking apparatus comprising an annular hollow housing adapted to be rotatably mounted on an axle, annular rim portions carried by and projecting from the opposite sides of the housing to receive a tire, the housing serving to support the rim portions and the tire on the axle, vanes in the housing, a vaned rotor in the housing, means forming a liquid reservoir at one side of the housing adjacent its periphery, the reservoir being carried by the housing for rotation therewith and being substantially coextensive radially with the housing, a conduit connecting the reservoir with the outer part of the housing at a point where liquid will flow inward and having an inwardly facing opening in the housing, a planetary gear set including a sun gear, a ring gear, a gear carrier and planet pinions on the carrier meshing with the sun and ring gears, the sun and ring gears being connected to the rotor and casing respectively, a releasable brake connected to the carrier to hold it against rotation, and a releasable brake connected to the housing, the gear set and brakes lying within the confines of the annular rim portions.

6. Braking apparatus comprising a hollow rotatable housing, vanes in the housing, a vaned rotor in the housing for rotation relative thereto, the housing and rotor defining a toroidal liquid circuit, an annular liquid reservoir carried by and rotatable with the housing and of substantially the same radial extent as the housing, and a conduit connecting the peripheral portion of the reservoir to the peripheral portion of the housing and terminating in an outlet opening in the toroidal liquid circuit facing in the direction of liquid flow in the circuit.

7. Braking apparatus comprising a hollow rotatable housing, vanes in the housing, a vaned rotor in the housing for rotation relative thereto, the housing and rotor defining a toroidal liquid circuit, an annular liquid reservoir carried by and rotatable with the housing end of substantially the same radial extent as the housing, a conduit connecting the peripheral portion of the reservoir to the peripheral portion of the housing and terminating in an outlet opening in the toroidal liquid circuit facing in the direction of liquid flow in the circuit, a differential gear set including three relatively rotatable elements, two of said elements being connected to the housing and the rotor respectively, and a brake connected to the third element to hold it against rotation thereby to cause the housing and the rotor to turn in opposite directions.

REXFORD OLAN ANDERSON.

REFERENCES CITED

The following references are of record in the file of this patent:

UNITED STATES PATENTS

| Number | Name | Date |
| --- | --- | --- |
| 1,975,362 | Hopkins | Oct. 2, 1934 |
| 1,992,911 | La Mater | Feb. 26, 1935 |
| 2,019,508 | Sauzedde | Nov. 5, 1935 |
| 2,077,080 | Tolman | Apr. 13, 1937 |
| 2,219,215 | Anderson | Oct. 22, 1940 |
| 2,241,189 | Dick | May 6, 1941 |
| 2,287,130 | Ramey | June 23, 1942 |
| 2,351,180 | Ash | June 13, 1944 |
| 2,429,989 | Buckendale | Nov. 4, 1947 |